(12) United States Patent
Tipper

(10) Patent No.: US 12,742,684 B2
(45) Date of Patent: *Sep. 22, 2026

(54) COMPUTER IMPLEMENTED METHOD FOR DETECTING SHORT PULSE LASERS

(71) Applicant: THE SECRETARY OF STATE FOR DEFENCE, Salisbury (GB)

(72) Inventor: Sean Michael Tsi-Ong Tipper, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 96 days.

This patent is subject to a terminal disclaimer.

(21) Appl. No.: 18/719,039

(22) PCT Filed: Nov. 15, 2022

(86) PCT No.: PCT/IB2022/060961

§ 371 (c)(1),
(2) Date: Jun. 12, 2024

(87) PCT Pub. No.: WO2023/111714

PCT Pub. Date: Jun. 22, 2023

(65) Prior Publication Data

US 2025/0044160 A1 Feb. 6, 2025

(30) Foreign Application Priority Data

Dec. 14, 2021 (GB) ..................................... 2118046

(51) Int. Cl.
*G01J 11/00* (2006.01)
*G01J 1/42* (2006.01)
(Continued)

(52) U.S. Cl.
CPC ............. *G01J 11/00* (2013.01); *G01J 1/4257* (2013.01); *G01S 7/4804* (2013.01); *H04N 25/40* (2023.01);
(Continued)

(58) Field of Classification Search
CPC .. G01J 11/00; G01J 1/4257; G01J 2001/4238; H04N 25/40; H04N 25/779; G01S 7/4804
See application file for complete search history.

(56) References Cited

U.S. PATENT DOCUMENTS 11,733,385 B1 * 8/2023 Summers .............. G01S 7/4865 356/3
12,022,210 B2 * 6/2024 Tipper .................. G01S 7/4804
(Continued)

FOREIGN PATENT DOCUMENTS

GB 2575717 A 1/2020
GB 2594581 A 3/2021
WO WO-2019229405 A1 * 12/2019 ............. G01J 11/00

OTHER PUBLICATIONS

International Patent Application No. PCT/IB2022/060961, International Preliminary Report on Patentability dated Jun. 27, 2024, 6 pages.

(Continued)

*Primary Examiner* — Jennifer D Bennett
(74) *Attorney, Agent, or Firm* — Kilpatrick Townsend & Stockton LLP

(57) ABSTRACT

The present application relates to the field of detecting pulsed radiation, in particular to methods and apparatus suitable for use in detecting short pulse lasers and extracting their pulse repetition frequencies, and especially an improved computer implemented method for detecting a pulse repetition frequency of pulsed radiation using a sensor array of sensor elements arranged in element lines.

21 Claims, 7 Drawing Sheets

(51) Int. Cl.

| | |
|---|---|
| ***G01S 7/48*** | (2006.01) |
| ***H04N 25/40*** | (2023.01) |
| ***H04N 25/779*** | (2023.01) |

(52) U.S. Cl.
CPC .... *H04N 25/779* (2023.01); *G01J 2001/4238* (2013.01)

(56) References Cited

U.S. PATENT DOCUMENTS

| | | | | |
|---|---|---|---|---|
| 2006/0082781 | A1* | 4/2006 | Chan .................... | A61B 5/4041 356/495 |
| 2019/0086197 | A1* | 3/2019 | Minoshima ............. | G01S 17/89 |
| 2019/0086518 | A1* | 3/2019 | Hallstig ................ | G01S 7/4816 |

OTHER PUBLICATIONS

United Kingdom Patent Application No. GB2118046.8, Search Report dated Mar. 4, 2022, 1 page.

International Patent Application No. PCT/IB2022/060961, International Search Report and Written Opinion dated Jan. 30, 2023, 9 pages.

United Kingdom Patent Application No. GB22175434, Search Report dated May 5, 2023, 1 page.

* cited by examiner

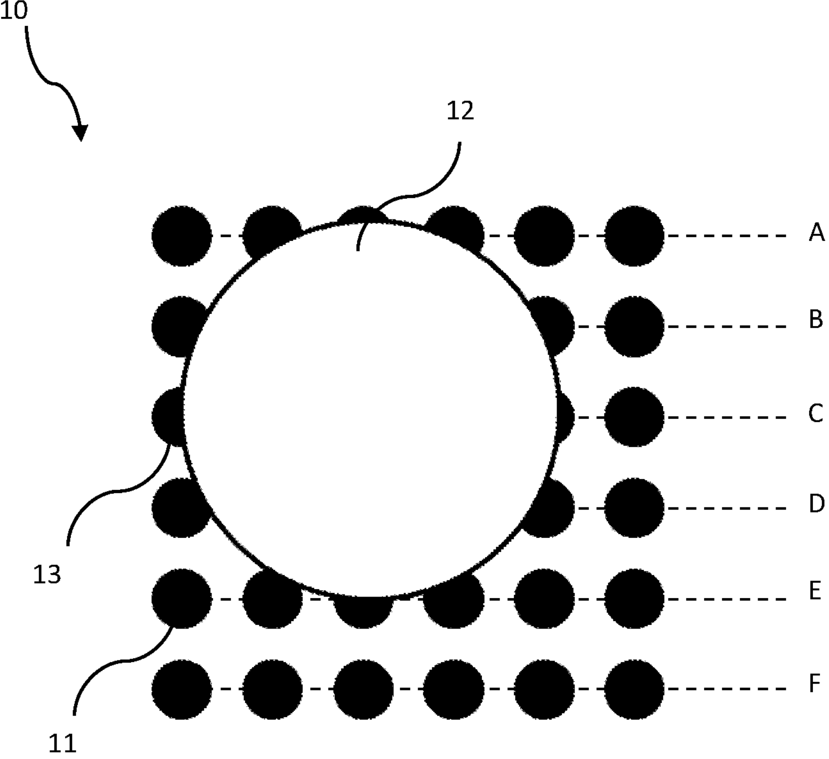
Figure 1 – PRIOR ART

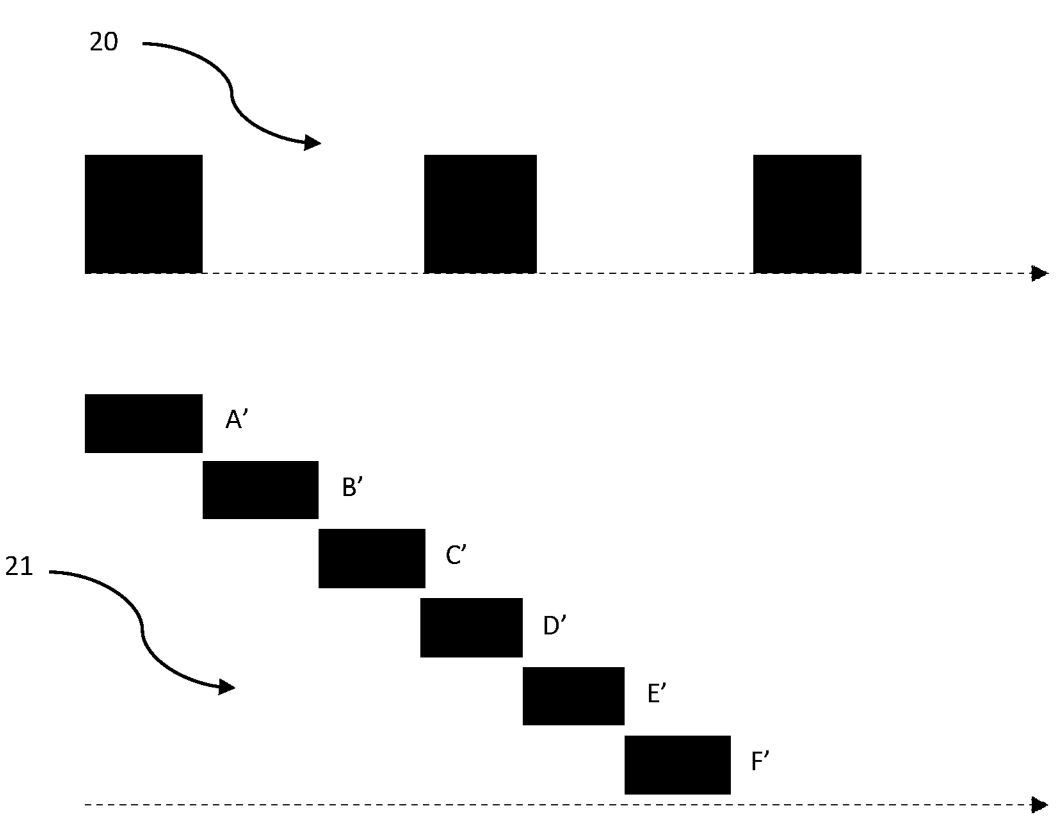
Figure 2a – PRIOR ART
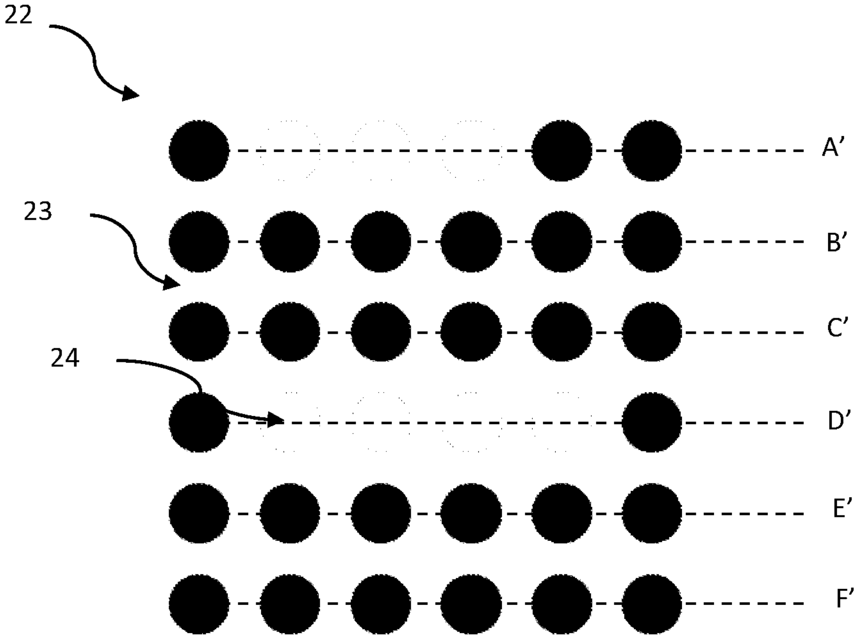
Figure 2b – PRIOR ART

| A‴ | B‴ | C‴ | D‴ | E‴ | F‴ |
|---|---|---|---|---|---|
| 1 | 1 | 0.5 | 0.5 | 1 | 1 |

33

COMPUTER IMPLEMENTED METHOD FOR DETECTING SHORT PULSE LASERS

TECHNICAL FIELD OF THE INVENTION

This invention relates to the field of detecting pulsed radiation, in particular to methods and apparatus suitable for use in detecting short pulse lasers and extracting their pulse repetition frequencies.

BACKGROUND TO THE INVENTION

Pulsed radiation is used in a variety of applications, from communications through to laser range finding and designation. In particular pulsed lasers may be used to deliver temporally short, high intensity, pulses of power onto an unknowing receiver with the deliberate intent of causing damage. Owing to the variety of applications of pulsed radiation, there exists a requirement for pulsed radiation detection. Detectors of pulsed radiation often become more expensive as the temporal demand on them (for instance laser pulse repetition frequency) increases. These expensive detectors are also undesirable in applications where there is a risk of detector damage (for instance when subject to high pulse powers). Therefore a number of lower cost detectors and detection methods have been developed to mitigate these issues.

An example of a low cost method of detecting pulsed radiation is provided in GB1907210.7. The method comprises irradiating a portion of an array of sensor elements with pulsed radiation and addressing the array using a rolling shutter operation to obtain a radiation image. A pulse detection operation is applied to the radiation image to detect a pulse repetition interval (or equivalently a frequency) of the pulsed radiation. The rolling shutter operation addresses lines of sensor elements in the array for a predetermined and configured integration period. This permits a low cost camera device to have wider utility in detecting higher frequency events than the standard frame rate would suggest. However the method disclosed in GB1907210.7 is limited in frequency coverage based on the Nyquist Theorem of sampling and the minimum predetermined integration period permitted by the camera or sensor array.

GB2104301.3 seeks to improve upon the low cost method disclosed in GB1907210.7 through recognition that an appropriately configured rolling shutter camera may in fact be considered as a continuously sampling detector. The disclosure in GB2104301.3 recognises that for high pulse repetition frequency lasers a further beating effect becomes apparent within pixel values of a radiation image. This beating effect can be utilised in a pulse detection operation to extract the unambiguous pulse repetition frequency of the source radiation, further extending the frequency coverage for such a low cost camera based detector. However GB2104301.3 is primarily directed towards modulated continuous wave lasers and not short pulse lasers such as pulsed nanosecond lasers that can still exhibit ambiguities at certain pulse repetition frequencies.

Therefore it is an aim of the present invention to provide an improved method of detecting pulsed radiation suitable for detecting short pulse lasers.

SUMMARY OF THE INVENTION

According to a first aspect of the invention there is provided a computer implemented method for detecting a pulse repetition frequency of pulsed radiation using a sensor array of sensor elements arranged in element lines, the method comprising the steps of: addressing the sensor array of sensor elements using a rolling shutter operation, wherein the rolling shutter operation comprises addressing each element line consecutively for a predetermined integration period; reading the sensor array to obtain a radiation image, the radiation image comprising a plurality of pixel values, with each pixel value corresponding to a sensor element in the sensor array; and then applying a pulse detection operation to the radiation image, thereby detecting the pulse repetition frequency of the pulsed radiation; wherein the pulse detection operation comprises: extracting a beat signal from the pixel values of the radiation image in a sensor array direction corresponding to the direction of the rolling shutter operation; calculating a beat frequency from the beat signal; calculating a peak to trough ratio from the beat signal; calculating a value for a pulse shape parameter of the beat signal; and then calculating a pulse repetition frequency of the pulsed radiation using a pulse repetition frequency function, the pulse repetition frequency function being a function of the beat frequency, peak to trough ratio and pulse shape parameter.

The inventors have recognised that a rolling shutter operation configured to address each element line consecutively can be considered to be continuously receiving pulsed radiation. At frequencies above the maximum frequency discernible under Nyquist (for a modified rolling shutter operation, equivalent to the reciprocal of twice the predetermined integration period), a beating effect occurs between the pulse repetition interval (equivalently pulse repetition frequency) of the pulsed radiation and the predetermined integration period of the rolling shutter operation. This beating effect is evident in the integrated energy received and stored for each element line in the sensor array. Also evident is that for increasing pulse repetition frequency of pulsed radiation, the number of cycles or waves of radiation integrated within a given predetermined integration period increases. Therefore the peak to trough ratio of the beating effect also can vary. In isolation neither the beat frequency nor peak to trough ratio is unique to a single pulse repetition frequency of pulsed radiation. Whilst their combination can provide a unique solution to identifying the pulse repetition frequency of pulsed radiation for modulated continuous wave sources, and for the majority of repetition frequencies for short pulse (for instance nanosecond) laser sources, there remains an ambiguity at certain short pulse laser repetition frequencies where the frequency and peak to trough ratio of the beat signal are similar. The precise pulse repetition frequencies at which this ambiguity arises is dependent on the pulse repetition of the pulsed radiation but also the integration period of the rolling shutter operation, because it is the beat signal of the two that are ambiguous in frequency and peak to trough ratio. However the inventors have shown that the pulse shape within the resultant beat signals is inherently different at this ambiguity. Extracting a value for a pulse shape parameter of the beat signal can therefore be used in conjunction with the peak to trough ratio and beat frequency to unambiguously resolve the true pulse repetition frequency of the pulsed radiation.

Pulsed radiation is intended to mean electromagnetic radiation in the form of pulses repeating at a pulse repetition interval (the inverse therefore being the pulse repetition frequency). The pulses themselves are discretely separate from each other in time. A pulse may have constant amplitude during its ‘on’ period, or may have variable amplitude, for instance further modulation may be present on the pulse itself for communication purposes. Radiation may be generated through use of a radiation source such as an LED, laser diode, or a laser. The pulsed radiation may be generated directly by the radiation source (for instance a laser switched on and off, or a Q-switched laser) or may be generated by the radiation source outputting continuous radiation that is then modulated (for instance by an electro-optic modulator). The invention has been shown to be particularly advantageous for short pulse lasers wherein the beat signal may be ambiguous in frequency and peak to trough ratio.

A sensor element means a device that is suitable for detecting electromagnetic radiation that has the wavelength of the pulsed radiation. The sensor element itself converts the pulsed radiation incident upon it to electrical energy. The material of which the sensor element is formed will be dependent therefore upon the wavelength of the pulsed radiation intended to be detected.

The sensor array of sensor elements is a plurality of sensor elements arranged in at least one dimension, as a plurality of element lines. Each element line being a linear distribution of sensor elements and may refer to a row of, for instance, a two dimensional array or a column of a two dimensional array. Each sensor element in the element array may be electrically isolated, such that the electrical energy generated by each element can be individually determined. An example of such an array is a CMOS sensor. A radiation image of a scene can be obtained by measuring the electrical energy generated by each sensor element in the sensor array. The sensor array in use would be irradiated with pulsed radiation across a plurality of element lines and the computer implemented method operated thereon.

In a rolling shutter operation each element line in a sensor array is addressed (allowed to convert incident radiation to electrical energy) for an integration period. After this period for a given element line, the electrical energy generated therefrom is 'read-out' for analysis in a data processing system. Each element line must be read-out separately in a rolling shutter operation, and therefore whilst each element line is addressed for the same integration period, the integration periods are not initiated simultaneously (as for a global shutter camera) and instead only partially overlap in time. For most rolling shutter cameras (for instance CMOS cameras such as used in mobile phones) the integration period is an unknown variable, with only the overall frame rate or inter-frame time being directly variable. This introduced an inherent limitation in the ability of a rolling shutter camera to detect high frequency events. This was initially improved upon in GB1907210.7 through varying of the element line integration periods to predetermined values related to pulse repetition frequencies of pulsed radiation. The inventors subsequently improved upon this capability further in GB2104301.3, to allow detection of frequencies beyond even the limitation imposed by the minimum predetermined integration period available for a rolling shutter camera (equivalent to the row readout time), and now have made even further improvements to yield a method particularly well adapted for use with short pulse lasers.

The radiation image obtained from the invention is at least a one dimensional (but preferably two dimensional) representation of the electrical energy generated by the sensor elements in the sensor array. When element lines in the sensor array have been exposed, the electrical energy generated from each sensor element may be transmitted into a processing system such as a computer and stored digitally as pixel values.

The pulse detection operation is a computer implemented operation that extracts the pulse repetition frequency of the pulsed radiation from the pixel values in the radiation image.

The beat signal manifests as a variation in pixel value in a sensor array direction that is in the direction of the rolling shutter operation (the direction or order in which the element lines of the sensor array are addressed). This is because the pulse repetition interval of the pulsed radiation is not perfectly matched with the predetermined integration period of the element lines. This beat signal can be extracted directly from the pixel values of the radiation image.

The beat frequency itself relates to the periodicity of the variation in pixel value in the direction of the rolling shutter operation. This can be observed directly in the pixel values but is preferably calculated by performing a Fourier Transform of the beat signal (for instance a spatial Fourier Transform of the radiation image in the direction of the rolling shutter operation).

The peak to trough ratio is the ratio of the maximum pixel value of the beat signal to the minimum pixel value of the beat signal. The term is intended to equally include embodiments that calculate and use the inverse value which is essentially the same calculation and can be used to have the same effect as a distinguishing variable in the computer implemented method. In some embodiments the step of calculating a peak to trough ratio comprises calculating an average peak to trough ratio over a cycle of the beat signal. In even more embodiments this is repeated for each of a plurality of cycles of the beat signal and an average value obtained. By calculating the peak to trough ratio across a plurality of cycles of the beat signal, the impact of spurious errors in signal on the calculation is minimised. This leads to a computer implemented method that is more tolerable to random effects and noise which can arise owing to atmospheric conditions, beam profile of the radiation source and artefacts from optical components on the optical path.

The pulse shape parameter is a parameter representative of the pulse shape/pattern within the beat signal. The parameter may be an average pixel value across a pulse or cycle of the beat signal, for instance. The parameter may alternatively be a quartile value of the pixel value across a pulse or cycle of the beat signal. Other parameters may be utilised, or other operations to generate such parameters (such as correlations) may be utilised, provided that the parameter itself is related to the pulse shape/pattern within the beat signal. Such parameters have been found to remove the ambiguity where beat signals have similar or identical beat frequencies and peak to trough ratios and so would otherwise be indistinguishable from each other, but the pattern in which the pixel values vary in the rolling shutter direction for these ambiguous repetition frequencies is distinctive. The beat frequency, peak to trough ratio, and pulse shape parameter are utilised together within a pulse repetition frequency function to determine the true pulse repetition frequency of the pulsed radiation.

The value of the pulse shape parameter may comprise calculating a mean average of the pixel values for the beat signal. The mean average is a measure of central tendency of a set of samples—it essentially recovers a "central" value from the sample set. The inventors have found that this central value has a dependency on pulse shape, particularly for short pulse laser radiation. For instance at pulse repetition frequencies where the first aspect of the invention would be ambiguous based on beat signal frequency and peak to trough ratio, the mean average is distinguishably different between the two ambiguous frequencies. This results from the shape of the beat signal being essentially inverted between the two ambiguous frequencies, leading to a mean average that is also different. Calculating the mean average is also a computationally efficient parameter that can be introduced without significant processing burden in-keeping with the provision of a relatively low cost detection system. More preferable is that the mean average is calculated for a cycle of the beat signal. Even more preferable is that the mean average is calculated for each of a plurality of cycles of the beat signal, and an average value obtained. This minimises the effect of spurious errors caused by noise, atmospherics, or other factors that cannot be controlled during a radiation image capture. Further preferred embodiments comprise the step of normalising the mean average. This may be performed by determining the maximum pixel value of the beat signal for the cycle for which the mean average is being calculated, and then dividing the mean average by that value. Normalising mitigates the influence of uncontrolled factors in the measurement process such as pulse power variability.

The pulse repetition frequency function may be a mathematical formula, but preferably is a data array of known pulse repetition frequencies with corresponding beat frequencies, peak to trough ratios and values for the pulse shape parameter. This allows the computer implemented method to be configured to detect both small and large subsets of pulse repetition frequencies. In these embodiments the step of calculating the pulse repetition frequency comprises performing a lookup operation of the beat frequency, peak to trough ratio, and pulse shape parameter with the data array.

In preferred embodiments of the invention the pulsed radiation is pulsed laser radiation. Pulsed laser radiation can be utilised in many applications owing to the narrow divergence of a laser delivering pulsed radiation at greater ranges than an alternative radiation device. Pulsed lasers are also used in many applications owing to the high pulse repetition rates achievable. Therefore the ability to modify a rolling shutter camera, already available in many electronic devices to provide a laser based communications capability, is particularly advantageous. The pulsed laser radiation may be visible for near infrared laser radiation, for instance. The invention is particularly advantageous for short pulse laser radiation such as nanosecond lasers.

In some embodiments the sensor array is a colour camera. A colour camera is particularly suitable for detecting pulsed laser radiation because the laser radiation is very narrow band and therefore despite filtering of the laser radiation through the various colour filters in a colour camera, the beat signal will still be evident above background noise in the radiation image. Alternatively the sensor array may be a monochrome camera capable of receiving the pulsed radiation. A monochrome camera does not filter the pulsed radiation as in a colour camera, and therefore even broadband pulsed radiation as well as pulsed laser radiation will induce a beat signal in the radiation image that can be extracted.

In preferred embodiments the predetermined integration period is substantially equal to a row read out time of the rolling shutter operation. The row read out time is the minimum predetermined integration period achievable in a rolling shutter camera, because of the fundamental requirement to read out the integrated energy from an element line before the next element line is addressed. Whilst the invention can operate with integration periods that are not substantially equal to the row read out time, this leads to an overlap in integration periods between the element lines and can distort the beat signal. Therefore it is preferred that the integration periods substantially equal the row read out time such that they do not overlap in time.

In some embodiments the pulse repetition frequency $f_{PRF}$ of the pulsed radiation satisfies Equation 1, $$f_{PRF} > \frac{1}{2T_{readout}} \quad \text{Equation 1}$$

wherein $T_{readout}$ is the row read out time of the rolling shutter operation. The method of the invention is particularly suited to resolving pulsed radiation beyond the apparent Nyquist limit. This further improves the capability of lower cost rolling shutter detectors and cameras.

In even more preferred embodiments, the pulse repetition frequency $f_{PRF}$ of the pulsed radiation satisfies Equation 2.

$$f_{PRF} \leq 100 \text{ kHz} \quad \text{Equation 2}$$

The method of the invention is particularly well suited to detecting pulsed radiation from devices operating with repetition frequencies equal to or below 100 kHz, through use of modified off the shelf CMOS sensors.

In some embodiments the step of calculating a beat frequency comprises applying a Fourier Transform to the beat signal. A Fourier Transform is a convenient computer implemented algorithm for extracting frequency components of a signal. A spatial Fourier Transform may for instance be applied to the pixel values of the radiation image in an array direction corresponding to the direction of the rolling shutter operation. In scenarios where the irradiance falling upon an individual sensor element is relatively low, the electrical energy generated by each sensor element in an element line may be integrated by virtue of summing the pixel values for that element line, the Fourier transform then acting on the summed pixel values of each of the element lines.

In preferred embodiments of the computer implemented method, upon detecting pulsed radiation, a protection means may be triggered. Pulsed radiation, in particular pulsed laser radiation may be damaging to the device upon which the method of the invention is being operated, or may be damaging to a device that is connected or in communication with the device upon which the method is operated. Therefore, it is advantageous to be able to activate or trigger protection means to protect said devices from damage. The protection means may be simply a reduction in gain applied to the sensor elements, or may be the introduction of a neutral density filter or sacrificial element in front of the array of sensor elements or in front of another sensor. The protection means may be a command to steer the device away from the current pointing direction and therefore away from the pulsed radiation itself, or may be a warning to not observe a particular viewing angle.

According to a second aspect of the invention, there is provided a computer program comprising computer code which when executed, performs the steps of the first aspect of the invention. The computer program can be conveniently programmed into non-volatile memory of a data processing means within for instance a CMOS camera device such as mobile phone camera.

According to a third aspect of the invention, there is provided computer readable storage media comprising the computer program of the second aspect of the invention. The computer program itself may reside within non-volatile memory that can be connected to and operate with a CMOS camera device, for instance.

According to a fourth aspect of the invention, there is provided a pulsed radiation detector, comprising a sensor array of sensor elements arranged in element lines, and a computer configured to perform the steps of the first aspect of the invention. This allows pulse repetition frequencies from short pulse lasers above the limitation related to the predetermined integration period in advanced rolling shutter devices, to now be detected using low cost rolling shutter devices.

Some embodiments of the fourth aspect of the invention further comprise optical means for defocussing pulsed radiation onto at least a portion of the sensor array. The step of defocussing may also be present in the first aspect of the invention. This may be achieved in a manner similar to that previously disclosed in GB2559657A, thereby enabling discrimination of laser sources upon which the method of the first aspect of the invention can be exercised. Energy generated by different element lines will have encoded within it information regarding the time varying amplitude of the pulsed radiation. For some radiation sources, such as a laser source that is inherently focussed at infinity, the spatial extent of the laser source on the array of sensor elements may be approximately the same size as a sensor element when the laser radiation is gathered and projected onto the array of sensor elements by a conventional camera lens. By providing optical means for defocussing the pulsed radiation this assists the spreading of pulsed radiation across multiple element lines of the sensor array, facilitating the detection of pulsed radiation using the rolling shutter effect. This may be implemented through use of a suitable optical means such as an optical configuration using lenses or mirrors to redirect/spread the pulsed radiation onto the sensor array. It is accepted that optical scatter effects may assist in spreading pulsed radiation over the sensor array, but reliance on such would not be sufficient for laser sources of relatively low radiative power (such that scatter is simply not detected by the array), and would be unpredictable in nature (changing scatter effects with varying lines of sight to a pulsed radiation source). Therefore the inventors have shown that actively taking the step of defocussing/redirecting/spreading the pulsed radiation onto the sensor array has a beneficial effect.

BRIEF DESCRIPTION OF THE DRAWINGS

Embodiments of the invention will now be described by way of example only and with reference to the accompanying drawings, in which:

FIG. 1 shows an illustration of a prior art sensor array of sensor elements forming the CMOS sensor in a mobile phone when imaging pulsed laser radiation;

FIG. 2*a* shows an illustration of a prior art rolling shutter method detecting pulsed radiation having a pulse repetition frequency below the Nyquist limit set by the integration period of the elements lines;

FIG. 2*b* shows an illustration of a radiation image of pulsed radiation, generated by the prior art method of FIG. 2*a;*

DETAILED DESCRIPTION

Figure 3A:
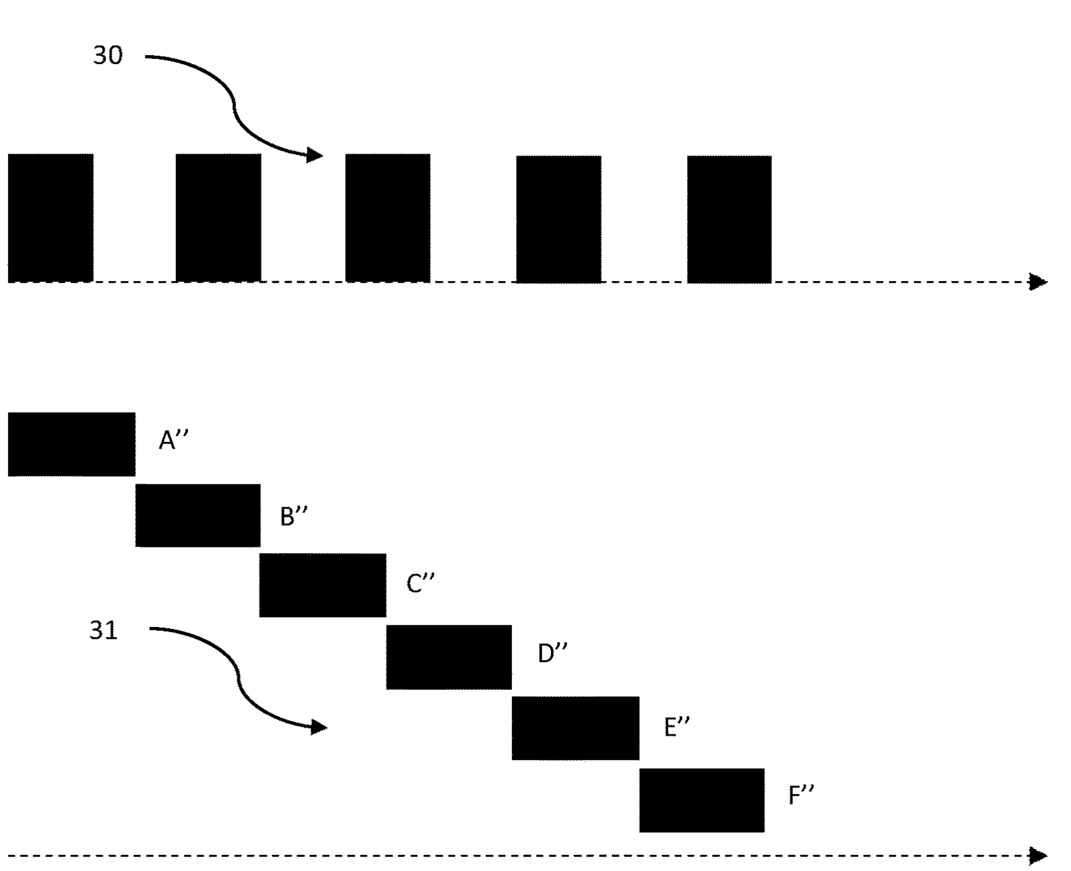
FIG. 3*a* shows an illustration of a modified rolling shutter method of detecting pulsed radiation having a pulse repetition frequency above the Nyquist limit set by the integration period of the element lines.

FIG. 1 shows an illustration of a prior art sensor array 10 of sensor elements 11 forming a CMOS sensor of a mobile phone camera. The sensor array 10 comprises element lines A→F. In this illustration, laser radiation 12 has been received by the sensor array 10 across a portion 13 of the sensor array 10. Therefore a plurality of the sensor elements 11 are irradiated.

FIG. 2*a* shows an illustration of a prior art modified rolling shutter operation wherein the element line integration times 21 have been modified. The integration times 21 are labelled A'→F' to correspond to the respective element lines in FIG. 1. Also shown in the figure is pulsed laser radiation 20. It can be seen from the figure that the integration times 21 labelled as A'→F' have been configured such that they do not overlap in time. The integration times 21 are minimised so as to be substantially equal to the row read out time of a rolling shutter operation (this is limited by camera or sensor array used, but for this embodiment is 25 μs). It can be seen that, the integration times A'→F' have been chosen such that each of the laser pulses in pulsed laser radiation 20 only occur in a single element line's integration time.

FIG. 2*b* shows an illustration of a radiation image 22 from a prior art sensor array addressed according to FIG. 2*a*. There is a clear pattern of dark regions 23 and light regions 24. The radiation image 22 now clearly shows the laser radiation is pulsed laser radiation. This prior art example is operating successfully below the Nyquist limit set by the integration times 21 in FIG. 2*a*, which here limits detectable frequencies to those having periods less than or equal to the inverse of twice the row read out time of 25 μs. This leads to a maximum detectable pulse repetition frequency of 20 kHz for the camera used (a Raspberry Pi camera v2).

FIG. 3*a* shows an illustration of a modified rolling shutter operation wherein the element line integration times 31 have been modified. The integration times 31 are labelled A"→F" to correspond to the respective element lines in FIG. 1. Also shown in the figure is pulsed laser radiation 30. It can be seen from the figure that the integration times 31 labelled as A"→F" have been configured such that they do not overlap in time. The integration times 31 are minimised so as to be substantially equal to the row read out time of the rolling shutter operation (again equal to 25 μs). It can be seen that the pulsed laser radiation 30 has a pulse repetition frequency such that the rolling shutter operation is operating beyond the Nyquist Limit set by the integration times 31. There are now pulses of pulsed radiation 30 being integrated within multiple integration times 31 labelled A"→F".

Figure 3B:
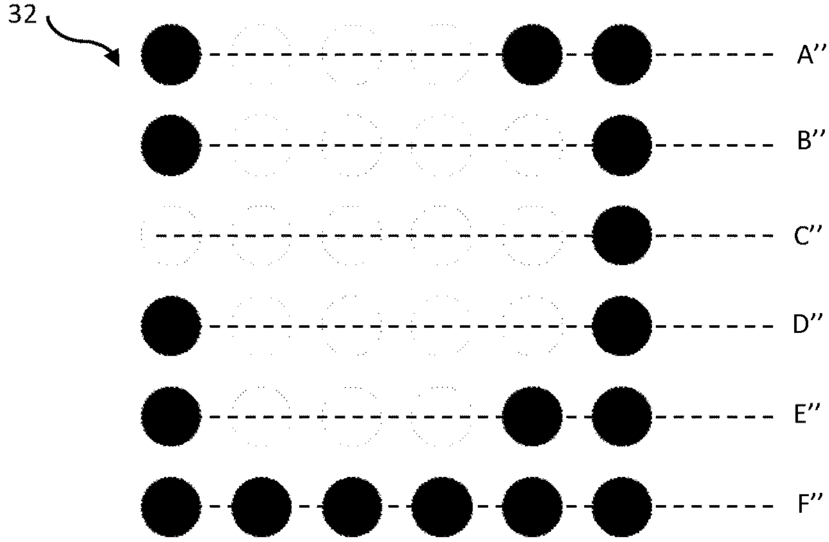
FIG. 3*b* shows an illustration of a radiation image of pulsed radiation, generated by the method of FIG. 3*a;*

FIG. 3*b* shows an illustration of a radiation image 32 from the sensor array addressed according to FIG. 3*a*. There is no clear pattern of dark and light regions. It cannot be clearly observed that there is pulsed radiation present from the single radiation image 32.

Figures 3C, 3D:
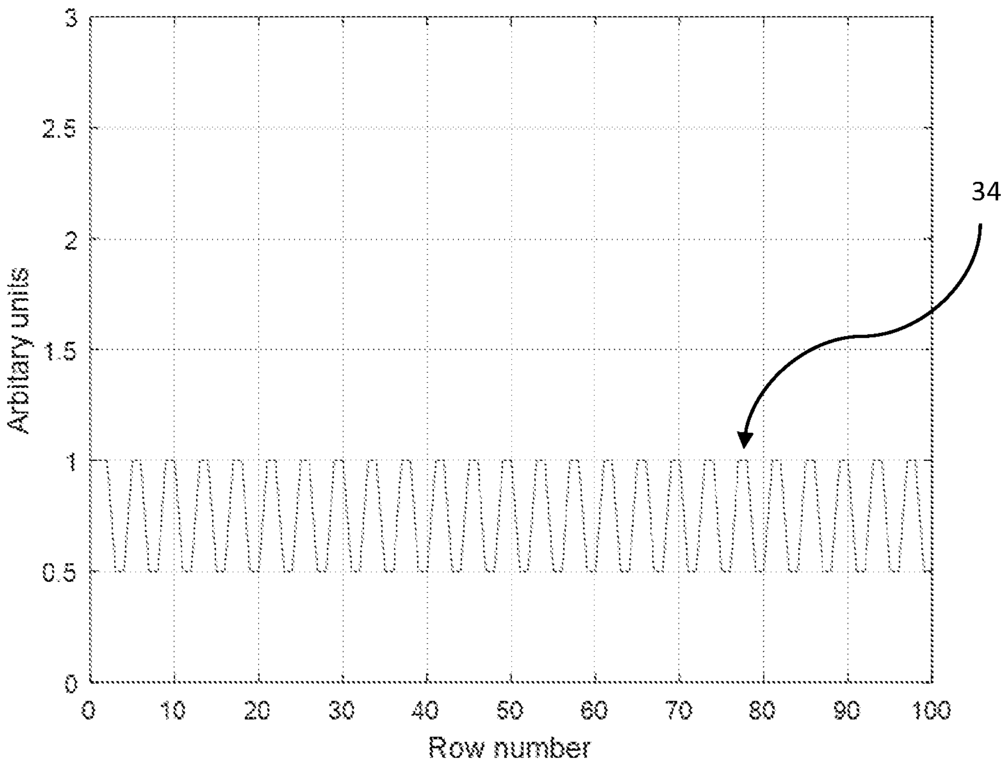
FIG. 3*c* shows an illustration of the pixel values in the radiation image of FIG. 3*b;*
FIG. 3*d* shows an illustration of a beat signal extracted from the pixel values in FIG. 3*c;*

FIG. 3*c* shows an illustration of pixel values 33 of the radiation image 32 in FIG. 3*b* in arbitrary units. The pixel values 33 have been obtained in an array direction of the radiation image 32 corresponding to the direction of the rolling shutter operation. The pixel values 33 shown are labelled A'''→F''' to highlight correspondence to the element lines A→F in FIG. 1 and therefore the rolling shutter direction. There is a subtle difference between the pixel values 33. This is because the pulse repetition frequency of the pulsed radiation 30 and the integration times 31 are not perfectly matched, and therefore a beating effect is observed in the pixel values. For instance a full pulse of radiation is received in integration periods A''' and B''', but only a partial pulse is received in C''' and D'''. FIG. 3*d* shows this beat signal 34 extracted from the pixel values across a sensor array of 100 element lines/rows. The beat signal 34 corresponds to a pulse repetition frequency of pulsed radiation equal to 30 kHz.

Figure 3E:
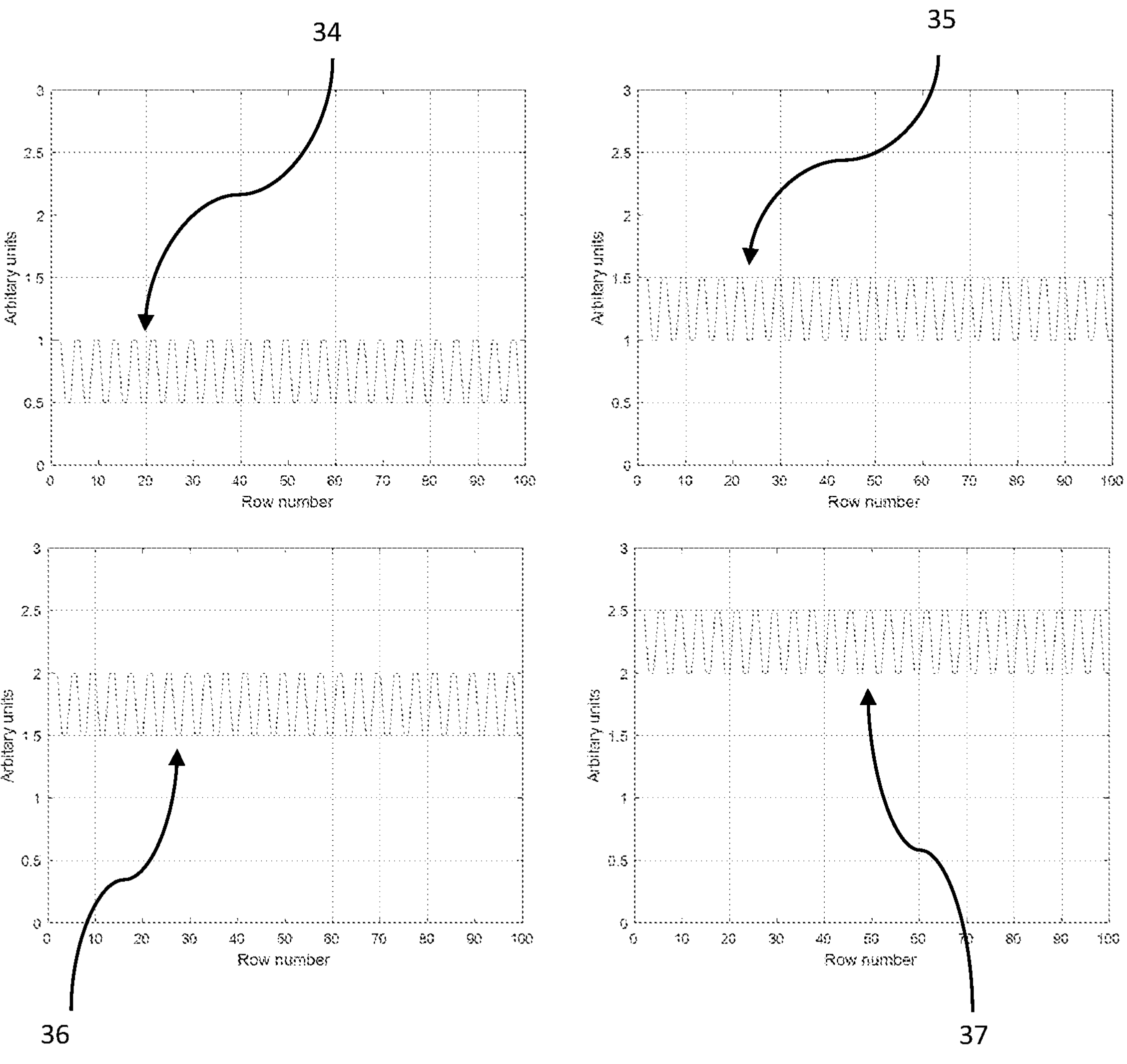
FIG. 3*e* shows an illustration of different beat signals for different pulse repetition frequencies above the Nyquist limit from a modulated CW laser source.

FIG. 3*e* shows an illustration of different beat signals 34, 35, 36, 37, corresponding to respective pulse repetition frequencies of 30 kHz, 50 kHz, 70 kHz and 90 kHz from a modulated continuous wave laser source, each of which is above the Nyquist limit set by the integration times of FIG. 3*a*. The beat signals (34-37) in this embodiment have the same beat frequency of 10 kHz and same span (difference between peak and trough values), however the absolute values of the peaks and troughs for each signal are different. For these embodiments this leads to a unique ratio for each beat signal (34-37) despite the beat frequency being the same.

Figure 3F:
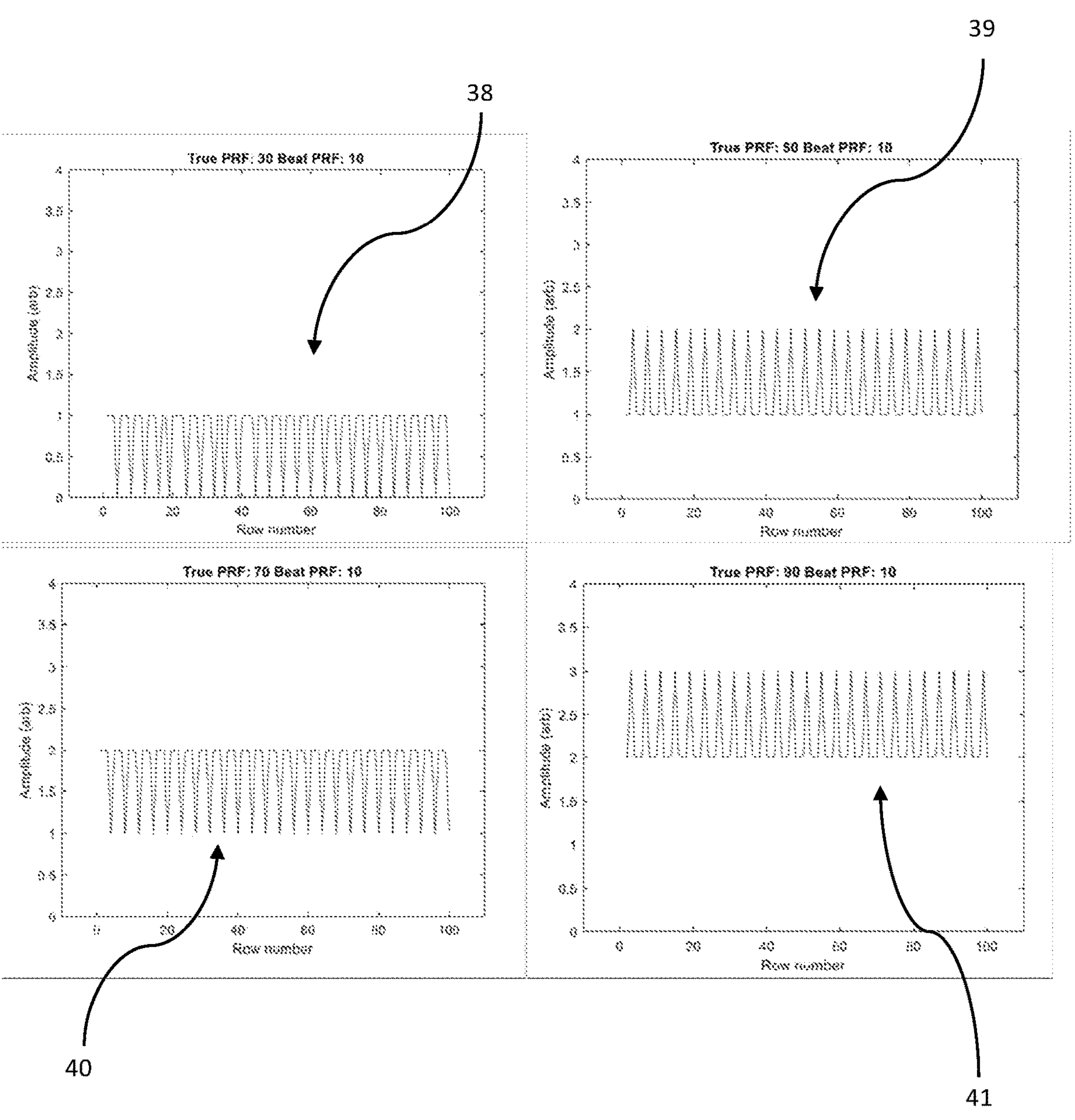
FIG. 3*f* shows an illustration of beat signals associated with different pulse repetition frequencies above the Nyquist limit from a short pulse laser.

FIG. 3*f* shows an illustration of different beat signals 38, 39, 40, 41, corresponding to respective pulse repetition frequencies of 30 kHz, 50 kHz, 70 kHz and 90 kHz from a pulsed nanosecond laser source. Again these pulse repetition frequencies are above the Nyquist limit set by the integration times of FIG. 3*a*. The beat signals 38-41 all have the same beat frequency of 10 kHz and so are deemed ambiguous in that regard. However the peak to trough ratio is not ambiguous between the 30 kHz 38, 90 kHz 41 and either of the 50 kHz or 70 kHz frequencies 39-40. As such a combination of the beat frequency and peak to trough ratio would unambiguously permit resolution of these pulse repetition frequencies from each other. However the 50 kHz 39 and 70 kHz 40 beat frequencies are ambiguous both in beat frequency and peak to trough ratio. They cannot be resolved from each other without determination of a further characteristic parameter. It is evident that these beat signals 39-40 have a visibly different pulse shape and pattern. This difference can be extracted by virtue of a normalised mean average of the beat signals 39-40 which for the 50 kHz associated beat signal 39 yields a value between 0.65 and 0.70, and for the 70 kHz associated beat signal 40 yields a value between 0.85 and 0.90. The addition of the normalised mean average allows for further discrimination and removal of the ambiguity of the beat signals 39-40.

Figure 4:
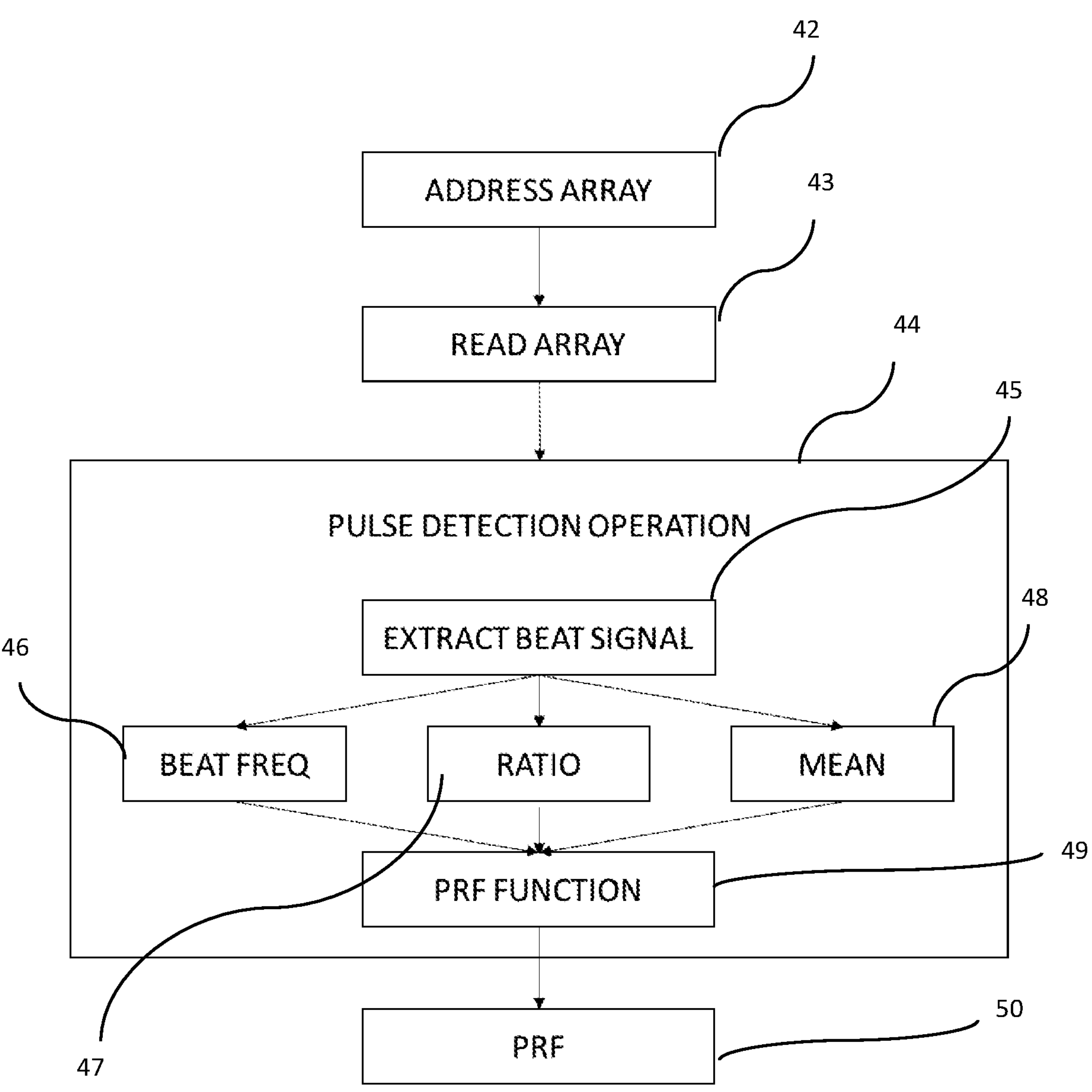
FIG. 4 shows an illustration of a computer implemented method of detecting pulsed radiation.

FIG. 4 shows an illustration of a computer implemented method of detecting pulsed radiation. A CMOS sensor array being irradiated across at least a portion of the array with pulsed radiation is addressed using a rolling shutter operation 42. In the rolling shutter operation each element line in the sensor array is addressed for a predetermined integration period equal to the row read out time of the rolling shutter operation. This is considered the minimum predetermined integration period available, and therefore under the Nyquist regime would correspond to the maximum detectable pulse repetition frequency of the pulsed radiation. In a subsequent step, the sensor array is read 43 to extract the integrated energy from each sensor element and convert the integrated energy into a pixel value for a pixel in a radiation image. This is performed by a computer system, the radiation image being a digital array of pixel values making up a digital image. A pulse detection operation 44 is then applied to the radiation image to obtain a pulse repetition frequency of the pulsed radiation. This involves extracting a beat signal 45 from the radiation image. The pixel values for each element line are summed, the beat signal becoming the summed value as a function of element line or row number, for instance. A beat frequency is calculated 46 from the beat signal using a Fourier Transform. The peak to trough ratio (Ratio) is also calculated 47 from the beat signal across a plurality of cycles in the radiation image and averaged. A value for a pulse shape parameter, in this case a normalised mean average, is further calculated 48 from the beat signal across a plurality of cycles in the radiation image and averaged. The beat frequency, peak to trough ratio, and normalised mean average are then used in a Pulse Repetition Frequency (PRF) function 49 to determine a PRF 50 of the pulsed radiation. The PRF function 49 comprises a lookup operation of the beat frequency, peak to trough ratio, and normalised mean average, with a data array held within computer memory. The data array is a multi-dimensional array containing known pulse repetition frequencies and associated beat frequencies and peak to trough ratios and normalised mean averages. By matching the beat frequency and peak to trough ratio and normalised mean average of the beat signal in the radiation image, a true PRF can be identified for the pulse radiation received by the sensor array. A tolerance may be provided for in the look-up operation, for instance a beat frequency within a range of values, having a peak to trough ratio within a range of values, and a normalised mean average within a range of values, may still correspond to a single known PRF in the data array for instance.

Whilst the figures illustrate pulsed radiation irradiating an array of sensor elements over a circular portion of the array, the method will operate with sensor arrays irradiated over non-circular portions. For instance a substantially linear portion of the array may be irradiated. The radiation may cover the entirety of, or a portion of, the array of sensor elements. A lens arrangement adapted to disperse incoming pulsed radiation may be used. The lens arrangement being configured to disperse the pulsed radiation in a predetermined direction, so that the radiation is spread across the array in that direction. This direction should have a component that is in the direction of the rolling shutter operation (and is typically substantially parallel thereto). This can be achieved by means of addition of a one dimensional dispersion element (e.g. a film or layer) or modification to the lenses), such as a series of parallel ridges on the surface thereof, or it could be achieved by adjusting the focal distance of the lens to be different in the different dimensions of the array. This would allow remote sources to be strongly defocussed across the array in the direction of dispersion (and more focused in the perpendicular direction). This would provide embodiments of the invention that enable signals to be collected and analysed from more than one source.

The invention claimed is:

1. A computer implemented method for detecting a pulse repetition frequency of pulsed radiation using a sensor array of sensor elements arranged in element lines, the method comprising the steps of:

a) addressing the sensor array of sensor elements using a rolling shutter operation, wherein the rolling shutter operation comprises addressing each element line consecutively for a predetermined integration period;

b) reading the sensor array to obtain a radiation image, the radiation image comprising a plurality of pixel values, with each pixel value corresponding to a sensor element in the sensor array; and then c) applying a pulse detection operation to the radiation image to detect a pulse repetition frequency of the pulsed radiation;

wherein the step of applying the pulse detection operation comprises the steps of:

d) extracting a beat signal from the pixel values of the radiation image in a sensor array direction corresponding to the direction of the rolling shutter operation;

e) calculating a beat frequency of the beat signal;

f) calculating a peak to trough ratio of the beat signal;

g) calculating a value for a pulse shape parameter of the beat signal; and then h) calculating a pulse repetition frequency of the pulsed radiation using a pulse repetition frequency function, the pulse repetition frequency being a function of the beat frequency, peak to trough ratio and pulse shape parameter.

2. The computer implemented method of claim 1, wherein the step of calculating a peak to trough ratio of the beat signal comprises calculating the peak to trough ratio for a cycle of the beat signal.

3. The computer implemented method of claim 2, wherein the step of calculating a peak to trough ratio of the beat signal comprises calculating an average peak to trough ratio for a plurality of cycles of the beat signal.

4. The computer implemented method of claim 1, wherein the step of calculating a value for a pulse shape parameter comprises calculating an average of the pixel values of the beat signal.

5. The computer implemented method of claim 4, wherein the step of calculating an average of the pixel values comprises calculating a mean average.

6. The computer implemented method of claim 5, wherein the step of calculating the mean average comprises calculating the mean average of the pixel values for a cycle of the beat signal.

7. The computer implemented method of claim 6, wherein the step of calculating the mean average comprises calculating the mean average of the pixel values for a plurality of cycles of the beat signal.

8. The computer implemented method of claim 5, wherein the step of calculating the mean average further comprises normalising the mean average.

9. The computer implemented method of claim 1, wherein the pulse repetition frequency function comprises a data array of known pulse repetition frequencies with corresponding beat frequencies, peak to trough ratios, and values of the pulse shape parameter, and the step of calculating a pulse repetition frequency comprises performing a lookup operation of the beat frequency, peak to trough ratio, and pulse shape parameter of the beat signal with the data array.

10. The computer implemented method of claim 1, characterised in that the pulsed radiation is laser radiation.

11. The computer implemented method of claim 1, wherein the sensor array is a colour camera.

12. The computer implemented method of claim 1, wherein the sensor array is a monochrome camera operable to receive the pulsed radiation.

13. The computer implemented method of claim 1, wherein the predetermined integration period is substantially equal to a row read out time of the rolling shutter operation.

14. The computer implemented method of claim 13, wherein the pulse repetition frequency $f_{PRF}$ of the pulsed radiation satisfies:

$$f_{PRF} > \frac{1}{2T_{readout}}$$

wherein $T_{readout}$ is the row read out time of the rolling shutter operation.

15. The computer implemented method of claim 14, wherein the pulse repetition frequency $f_{PRF}$ of the pulsed radiation satisfies:

$f_{PRF} \leq 100$ KHz

16. The computer implemented method of claim 1, wherein the step of calculating a beat frequency comprises applying a fourier transform to the beat signal.

17. The computer implemented method of claim 1, wherein the method further comprises the step of triggering a protecting means.

18. A pulsed radiation detector, comprising a sensor array of sensor elements arranged in element lines, and a computer configured to perform the steps of claim 1.

19. The pulsed radiation detector of claim 18, further comprising optical means for defocusing pulsed radiation onto at least a portion of the sensor array.

20. A non-transitory computer-readable medium storing computer-executable instructions, wherein when executed by a processing device, cause the processing device to perform operations comprising:

addressing a sensor array of sensor elements using a rolling shutter operation, wherein the rolling shutter operation comprises addressing each element line consecutively for a predetermined integration period;

reading the sensor array to obtain a radiation image, the radiation image comprising a plurality of pixel values, with each pixel value corresponding to a sensor element in the sensor array; and applying a pulse detection operation to the radiation image to detect a pulse repetition frequency of pulsed radiation, wherein applying the pulse detection operation comprises:

extracting a beat signal from the pixel values of the radiation image in a sensor array direction corresponding to the direction of the rolling shutter operation;

calculating a beat frequency of the beat signal;

calculating a peak to trough ratio of the beat signal;

calculating a value for a pulse shape parameter of the beat signal; and calculating a pulse repetition frequency of the pulsed radiation using a pulse repetition frequency function, the pulse repetition frequency being a function of the beat frequency, peak to trough ratio and pulse shape parameter.

21. The non-transitory computer-readable medium of claim 20, wherein the operation of calculating a peak to trough ratio of the beat signal comprises calculating the peak to trough ratio for a cycle of the beat signal.

* * * * *